US011459983B1

(12) United States Patent
Eden et al.

(10) Patent No.: US 11,459,983 B1
(45) Date of Patent: Oct. 4, 2022

(54) INTAKE SYSTEM FOR AN INTERNAL COMBUSTION ENGINE

(71) Applicant: Ford Global Technologies, LLC, Dearborn, MI (US)

(72) Inventors: Alan Eden, Canton, MI (US); Bret Wayne Harris, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/411,336

(22) Filed: Aug. 25, 2021

(51) Int. Cl.
*F02M 35/10* (2006.01)
*F02D 41/00* (2006.01)
*F02M 35/104* (2006.01)

(52) U.S. Cl.
CPC ....... *F02M 35/104* (2013.01); *F02D 41/0002* (2013.01); *F02M 35/10255* (2013.01); *F02M 35/10262* (2013.01); *F02D 2200/101* (2013.01)

(58) Field of Classification Search
CPC .............. F02M 35/10; F02M 35/104; F02M 35/10225; F02M 35/10262; F02D 41/00; F02D 41/0002; F02D 2200/101
See application file for complete search history.

(56) References Cited

U.S. PATENT DOCUMENTS

| | | | | |
|---|---|---|---|---|
| 5,515,822 A * | 5/1996 | Kobayashi | ....... | F02M 35/10045 123/184.48 |
| 6,161,513 A * | 12/2000 | Lohr | ................ | F02M 35/10288 123/184.34 |
| 6,308,686 B1 * | 10/2001 | Mammarella | ........ | F02M 35/116 123/456 |
| 6,346,018 B1 * | 2/2002 | Watanabe | ............. | F02F 7/0068 440/88 L |
| 6,679,215 B2 * | 1/2004 | Benson | .................... | F02B 75/22 123/184.61 |
| 6,837,204 B1 | 1/2005 | Stuart | | |
| 7,584,821 B2 | 9/2009 | Prior et al. | | |
| 8,191,525 B2 * | 6/2012 | Born | ................ | F02M 35/10045 123/184.21 |
| 9,938,869 B2 | 4/2018 | Dwivedi et al. | | |
| 2004/0194750 A1 * | 10/2004 | Tanikawa | ......... | F02M 35/10347 123/184.57 |
| 2005/0005888 A1 * | 1/2005 | Brassell | ............... | F02M 35/116 123/184.61 |
| 2005/0279310 A1 * | 12/2005 | Kondo | .................. | F02D 9/1095 123/184.52 |
| 2006/0005820 A1 * | 1/2006 | Jeon | ................. | F02M 35/10072 123/572 |
| 2008/0276895 A1 * | 11/2008 | Phaneuf | ............... | F02M 35/116 123/184.53 |
| 2010/0294226 A1 * | 11/2010 | Gupta | .............. | F02M 35/10078 123/184.21 |

(Continued)

*Primary Examiner* — John Kwon
*Assistant Examiner* — Johnny H Hoang
(74) *Attorney, Agent, or Firm* — Brooks Kushman P.C.; Vincent Mastrogiacomo (57) ABSTRACT

An intake manifold for an engine includes first and second runners that each extend from a plenum to a mounting face of the intake manifold. The mounting face mates with a corresponding face of a cylinder head. The intake manifold defines a passage directly fluidly coupling the first runner to the second runner to reduce engine noise. The passage is spaced apart from the plenum and the mounting face. A method of controlling engine noise is also provided.

19 Claims, 4 Drawing Sheets

(56) References Cited

U.S. PATENT DOCUMENTS

| | | | | |
|---|---|---|---|---|
| 2011/0100315 A1* | 5/2011 | Vichinsky | ........ | F02M 35/10321 |
| | | | | 123/184.53 |
| 2011/0277717 A1* | 11/2011 | Groleau | ........... | F02M 35/10032 |
| | | | | 123/184.34 |
| 2012/0285426 A1* | 11/2012 | Hayman | .......... | F02M 35/10222 |
| | | | | 123/563 |
| 2014/0102423 A1* | 4/2014 | Owen | ................ | F02M 35/1047 |
| | | | | 123/542 |
| 2014/0216387 A1* | 8/2014 | Kulkarni | ............. | F02M 35/112 |
| | | | | 123/184.47 |
| 2016/0115918 A1* | 4/2016 | Kulkarni | ................ | B60K 13/02 |
| | | | | 123/590 |
| 2018/0223778 A1* | 8/2018 | Chittoor | ........... | F02M 35/10085 |

\* cited by examiner

INTAKE SYSTEM FOR AN INTERNAL COMBUSTION ENGINE

TECHNICAL FIELD

Various embodiments relate to an air intake system for an internal combustion engine.

BACKGROUND

Engine noise may be caused in part by pressure waves in runners of an intake manifold. Engine noise may contribute to noise, vibration, and harshness (NVH) of the engine and an associated vehicle, as well as contribute to cabin noise.

SUMMARY

In an example, an engine is provided with a cylinder head having a first face, with the first face defining a first entrance to a first intake port and a second entrance to a second intake port. An intake manifold has a first runner and a second runner each extending from a plenum to a second face of the intake manifold. The second face defines a first outlet from the first runner and a second outlet from the second runner. The first and second faces mate to fluidly connect the first outlet to the first entrance and fluidly connect the second outlet to the second entrance. The intake manifold defines a passage directly fluidly coupling the first runner to the second runner to reduce engine noise, with the passage spaced apart from the plenum and the second face.

In another example, an intake manifold is provided with at least one shell forming a plurality of runners. Each runner has an inner wall extending from a first end to a second end, with the second end of each of the runners intersecting a mounting face to define an outlet therefrom. The mounting face is adapted to connect to a corresponding mounting face of a cylinder head. The shell defines a passage intersecting the inner walls of two adjacent runners of the plurality of runners. The passage is spaced apart from the first and second ends of the two adjacent runners, and fluidly couples the two adjacent runners.

In an example, a method of controlling engine noise is provided. An air intake for the engine is provided with a plurality of runners, with each runner having an internal side wall and extending from a first end to a second end. The first ends of the plurality of runners are connected to a plenum, and the second ends of the plurality of runners intersect an intake mounting face. A passage is provided between adjacent runners of the plurality of runners to fluidly couple the two adjacent runners. The passage intersects the side walls of the two adjacent runners, and is spaced apart from the first ends and the second ends of the two adjacent runners. Intake gases are flowed through the passage from one runner of the two adjacent runners to the other of the two adjacent runners during engine operation to reduce engine noise caused by a pressure wave in the one runner of the two adjacent runners.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
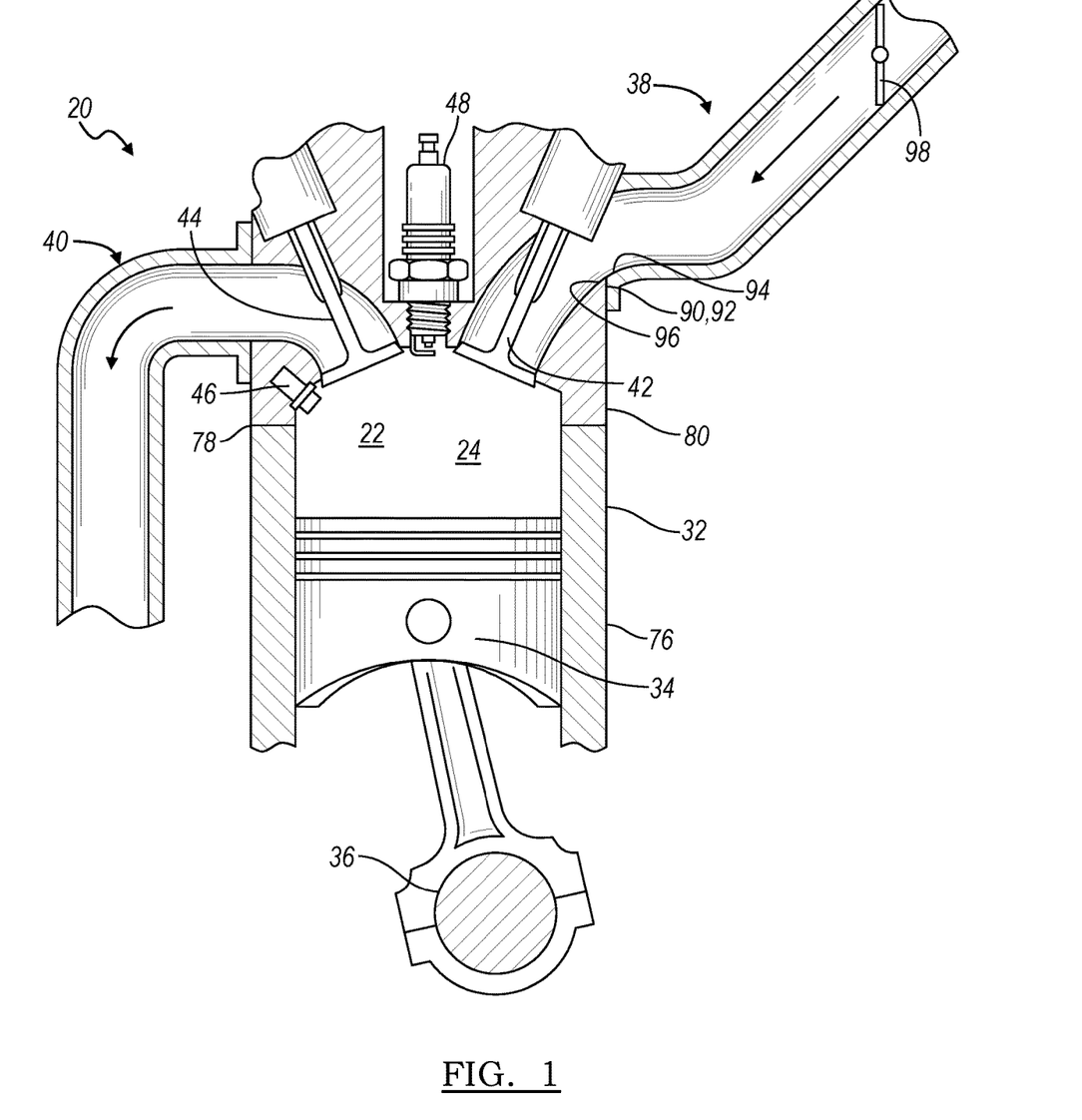
FIG. 1 illustrates a schematic view of an internal combustion engine configured to implement various embodiments of the present disclosure.

FIG. 1 illustrates a schematic of an internal combustion engine 20. The engine 20 has a plurality of cylinders 22, and one cylinder is illustrated. The engine 20 may have any number of cylinders 22, including three, four, six, eight, or another number. The cylinders may be positioned in various configurations in the engine, for example, as a V-engine, an inline engine, or another arrangement.

The engine 20 has a combustion chamber 24 associated with each cylinder 22. The cylinder 22 is formed by cylinder walls 32 and piston 34. The piston 34 is connected to a crankshaft 36. The engine 20 displacement may be controlled in part by the distance that the piston 34 travels in the cylinder 22, also known as the stroke. The combustion chamber 24 is in fluid communication with the intake manifold 38 and the exhaust manifold 40. An intake valve 42 controls flow from the intake manifold 38 into the combustion chamber 24. An exhaust valve 44 controls flow from the combustion chamber 24 to the exhaust manifold 40. The intake and exhaust valves 42, 44 may be operated in various ways as is known in the art to control the engine operation. Each cylinder may have one or two intake ports, and one or two exhaust ports that are connected to the intake manifold 38 and the exhaust manifold 40, respectively.

The engine 20 and intake manifold 38 may be operated as a naturally aspirated engine. Alternatively, the engine 20 may be a forced induction engine, with the intake manifold including or in communication with a turbocharger, supercharger, or the like. The intake 38 may also include a throttle valve to control the flow of intake gases to the plenum, and the valve position may be electronically or mechanically controlled. The intake 38 may be connected to an exhaust gas recirculation (EGR) system, a canister purge valve (CPV) and fuel system, a positive crankcase ventilation (PCV) system, a turbocharging system, a brake booster system, and the like. An air filter may also be provided in the intake manifold or in fluid communication with the intake system.

A fuel injector 46 delivers fuel from a fuel system directly into the combustion chamber 24 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 24. In other embodiments, other fuel delivery systems and ignition systems or techniques may be used, including compression ignition.

The engine 20 includes a controller and various sensors configured to provide signals to the controller for use in controlling the air and fuel delivery to the engine, the ignition timing, the power and torque output from the engine, and the like. Engine sensors may include, but are not limited to, an oxygen sensor in the exhaust manifold 40, an engine coolant temperature, an accelerator pedal position sensor, an engine manifold pressure (MAP) sensor, an engine position sensor for crankshaft position, an air mass sensor in the intake manifold 38, a throttle position sensor, and the like.

In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 may operate under a four-stroke cycle including an intake stroke, a compression stroke, an ignition stroke, and an exhaust stroke. In other embodiments, the engine may operate with a two stroke cycle. During the intake stroke, the intake valve 42 opens and the exhaust valve 44 closes while the piston 34 moves from the top of the cylinder 22 to the bottom of the cylinder 22 to introduce air from the intake manifold to the combustion chamber. The piston 34 position at the top of the cylinder 22 is generally known as top dead center (TDC). The piston 34 position at the bottom of the cylinder is generally known as bottom dead center (BDC).

During the compression stroke, the intake and exhaust valves 42, 44 are closed. The piston 34 moves from the bottom towards the top of the cylinder 22 to compress the air within the combustion chamber 24.

Fuel is introduced into the combustion chamber 24 and ignited. In the engine 20 shown, the fuel is injected into the chamber 24 and is then ignited using spark plug 48. The engine 20 may use direct injection or a port fuel injection system. In other examples, the fuel may be ignited using compression ignition.

During the expansion stroke, the ignited fuel air mixture in the combustion chamber 24 expands, thereby causing the piston 34 to move from the top of the cylinder 22 to the bottom of the cylinder 22. The movement of the piston 34 causes a corresponding movement in crankshaft 36 and provides for a mechanical torque output from the engine 20.

During the exhaust stroke, the intake valve 42 remains closed, and the exhaust valve 44 opens. The piston 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust manifold 40 and to an after treatment system such as a catalytic converter.

The intake and exhaust valve 42, 44 positions and timing, as well as the fuel injection timing and ignition timing may be varied for the various engine strokes, and furthermore may be varied as a function of engine speed.

The engine 20 includes a cooling system to remove heat from the engine 20, and may be integrated into the engine 20 as a cooling jacket containing water or another coolant.

A head gasket 78 is positioned between the cylinder block 76 and the cylinder head 80 to seal the cylinders 22.

The intake manifold 38 defines a mounting face 90 that cooperates or mates with a mounting face 92 of the cylinder head 80. A gasket or other sealing member (not shown) may be positioned between the mounting faces 90, 92. The mounting face 90 of the intake manifold 38 defines an outlet 94 from a runner of the intake manifold 38 as described below in further detail. The mounting face 92 of the cylinder head 80 defines an entrance 96 to the intake port. Although only one entrance and outlet are shown in the schematic view of FIG. 1, the mounting faces 90, 92 may define additional outlets and entrances based on the number of intake ports that the intake manifold 38 is supplying intake air to. The two mounting faces 90, 92 mate with one another to fluidly connect the outlet 94 to the entrance 96 and provide intake air from the intake manifold 38 to the engine 20. The intake manifold 38 may include or may be positioned downstream of a throttle body valve 98.

Figure 2:
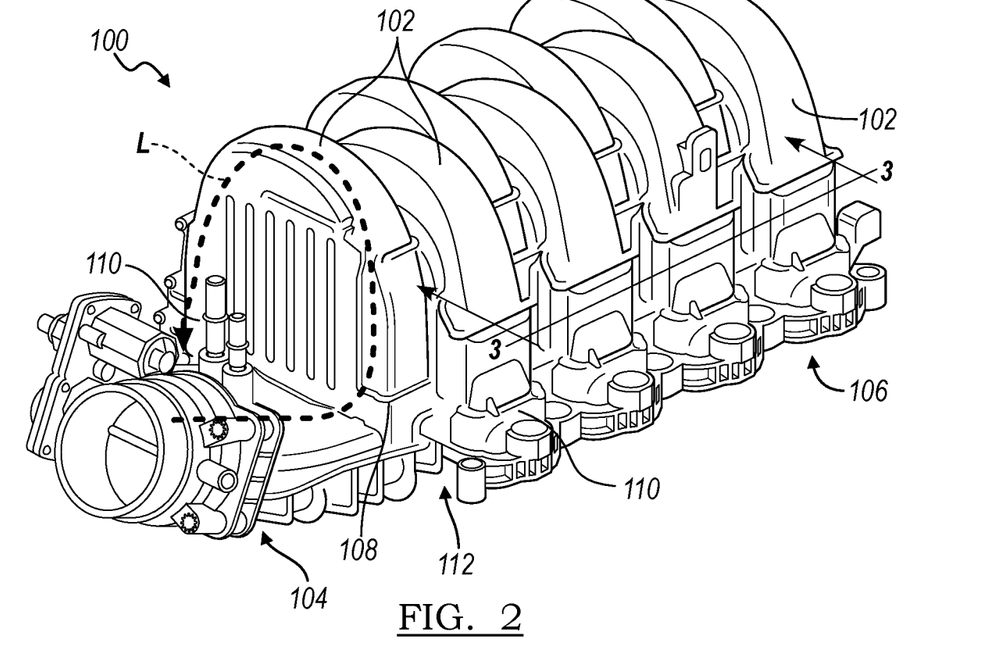
FIG. 2 illustrates a perspective view of an intake manifold according to an embodiment.
Figure 3:
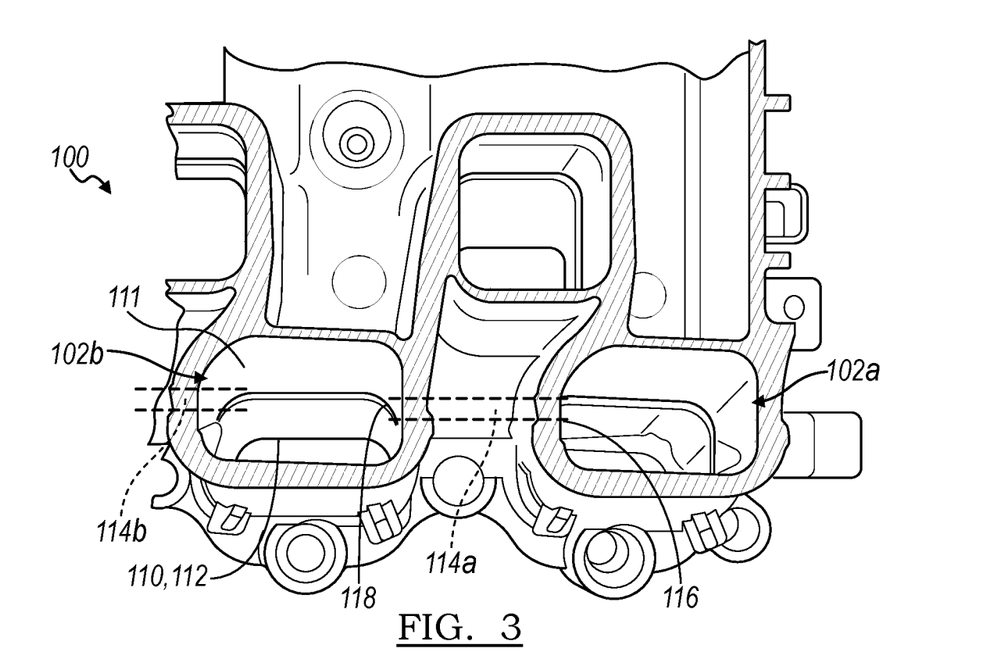
FIG. 3 illustrates a sectional view of the intake manifold of FIG. 2.
Figure 4:
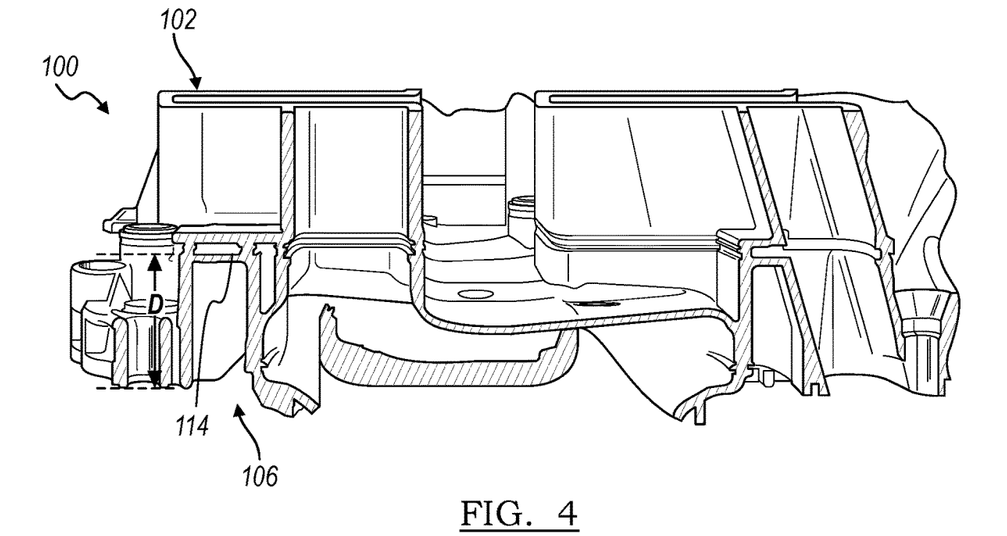
FIG. 4 illustrates another sectional view of the intake manifold of FIG. 3.

FIGS. 2-4 illustrates an intake manifold 100 for an engine, such as engine 20. The intake manifold 100 may be used as intake 38 in the engine 20. The intake manifold is formed from one or more shells that define a plurality of runners 102 in fluid communication and receiving intake air or gases from a plenum 104. The runners 102 may connect to a common plenum 104, or may connect to two or more plenums. In the example shown, the intake manifold 100 has two sets of four runners 102 that are connected to a single common plenum 104. The plenum 104 may be connected to and positioned downstream of the throttle valve 98. The engine 20 may be provided with one intake manifold 100 or with two or more intake manifolds 100 that are the same as one another or different from one another. In the example shown, the engine 20 has a single intake manifold 100 for the intake 38. In one example, the intake manifold 100 is formed from a plastic or composite material. The intake manifold connects to the cylinder head via a mounting face 106.

The intake manifold 100 may be provided with runners 102. In the example shown, each of the runners 102 have the same runner length L, or substantially the same runner length L as the other runners in the intake manifold 38. In other examples, the runner lengths of the runners 102 may be different from one another. As used herein, substantially means within five percent, ten percent, or fifteen percent of the associated parameter. A runner length L is the linear distance from the outlet of the runner at the mounting face 106 to a common point shared by the runners in the manifold 38, e.g. at or within the plenum 104. In one example, the runner 102 may have any length. In other examples, the runner may have a runner length L of more than four inches, more than eight inches, or more than twelve inches.

According to the present disclosure, a runner 102 in an intake manifold may have high in-duct pressure pulsations which may be mitigated by the use of a controlled leakage passage connecting adjacent runners together, while minimally impacting engine performance and emissions, as described below.

Each runner 102 extends from a first end 108 that is fluidly connected and intersects the plenum 104 to a second end 110 that intersects the mounting face 106, and is fluidly coupled to the associated intake port of the cylinder head. Each runner 102 has an internal wall 111 that extends from the first end 108 to the second end 110 of the runner and defines the runner. The runners 102 direct the intake gases, including ambient air, exhaust gases from exhaust gas recirculation, etc. to the intake valves 42. The runners 102 may be arranged within the intake manifold to be adjacent to one another. In the example shown, the runners 102 may be generally U-shaped, although, other shapes are also contemplated.

As shown in the Figures, the runners 102 each intersect the mounting face 106, such that there are outlets 112 from the intake manifold. The outlets 112 are in turn fluidly connected to the entrances or inlets to the intake ports when the intake manifold 100 is assembled to an associated cylinder head and the mounting face 106 of the intake manifold is mated to the associated mounting face of the cylinder head. In the example shown, there are two sets of four runners 102 that connect to two sets of four entrances or inlets to the intake ports when the intake manifold 100 is assembled to the cylinder head.

The intake manifold 100 defines one or more passages 114. Each passage 114 may provide a controlled leakage pathway or port between adjacent runners for fluid flow of intake gases between the adjacent runners, and the passage 114 is engineered or otherwise formed and provided in the intake manifold 100. In the example shown, the intake manifold has multiple passages 114, with a first passage 114a extending between and fluidly connecting the first and second runners 102a, 102b; and a second passage 114b extending between and fluidly connecting the second and third runners 102b, 102c. A third passage may extend between and fluidly connecting third and fourth runners. Therefore, the intake manifold 100 shown has (n−1) passages 114, where n is the number of runners 102 in a set. In other examples, the intake manifold 100 shown has (n−2) passages 114, for example, where n is the number of runners 102 in a V-block engine. In other examples, the intake manifold 100 may have only one passage 114, or fewer than (n−1) passages 114, where n is the number of runners in the engine. Furthermore, it is also contemplated, that the intake manifold 100 may have n or more passages 114, with more than one passage 114 fluidly connecting two adjacent runners 102 for some or all of the pairs of adjacent runners 102, and where n is the number of runners in the engine. As described below with reference to FIGS. 5-6, the passages 114 provide controlled fluid flow, or flow of intake gases, between the runners 102 to reduce engine noise caused by acoustics within the intake manifold 100.

Each passage 114 extends from a first end 116 to a second end 118 of the passage, and directly fluidly couples only two adjacent runners 102. The first end 116 of the passage intersects the internal wall 111 of one of the two adjacent runners, and the second end 118 of the passage intersects the internal wall 111 of the other of the two adjacent runners. The passage 114 may be continuous between the two ends 116, 118, e.g. such that all air within the passage 114 may only enter and/or exit the passage via one of the two ends 116, 118 of the passage. Each passage 114, and its respective first and second ends 116, 118, are spaced apart from the plenum 104 and the cylinder head mounting face 106 of the intake manifold. Each passage 114, and its respective first and second ends 116, 118, are therefore positioned between and spaced apart from the first and second ends 108, 110 of their associated runners.

In one example, the passages 114 are positioned at substantially the same distance D from the mounting face 106 along the runners 102 as one another, or at corresponding distances D along the two runners. The distance D is the linear distance along the runner 102 from the cylinder head mounting face 106, and is less than the runner length L. In this case, the passages 114 would lie in or intersect a common plane that is parallel to the mounting face 106. In other examples, the passages 114 may be positioned at varying distances D1, D2, etc. from the mounting face 106 compared to one another. For example, the different passages 114 may be positioned at different lengths D1, D2, etc. from the mounting face 106, and/or the two ends 116, 118 of each passage may be positioned at different distances D1, D2, etc. from the mounting face 106. D2 is another linear distance along the runner 102 from the cylinder head mounting face 106, and is less than the distance D1, and less than length L.

In one example, the passages 114 are provided without a valve, closure member, or the like that would allow the passages 114 to be closed or reduced in size during engine operation. As such, the passages 114 are valveless. The passages 114 therefore also remain unobstructed during engine operation, and across an engine speed operating range from idle speed to maximum engine speed. In another example, the passages 114 may be provided with a valve or other closure member that are controller to selectively open and close the passages 114, or change the cross-sectional area, during engine operation to selectively fluidly connect adjacent runners, for example as a function of engine speed.

In one example, the passages 114 have substantially the same cross-sectional area, or effective diameter, as one another. Each passage 114 may have a constant cross-sectional area along the passage, or may vary in size, with the cross-sectional area taken as the smallest cross-sectional area for the passage. In other examples, the passages 114 may have varying cross-sectional areas compared to one another.

The passages 114 may each extend generally linearly through the intake manifold 100 and between its two ends 116, 118. In a further example, the passages 114 extend along a common line, such that the first and second ends 116, 118 of each passage 114 lie along the line. Alternatively, the passages 114 may each have a curved or other shape, for example, based on the structure of the intake manifold 100.

The location (distance) of the passage 114 relative to the runner length L and/or the cross-sectional areas of the passage 114 may be tuned, or adjusted in location or size, to reduce or attenuate engine noise at selected engine speeds. The distance of the passages 114 and/or the cross-sectional areas of the passages 114 may be also be tuned or adjusted in location or size to limit degradation in engine performance metrics, such as power and torque.

In the present example, each passage 114, and its associated first and second ends 116, 118, are positioned at substantially the same distance D from the mounting face 106, and at a distance D within the runner 102 that lies within the range of 5-20% of an overall runner length L for one runner for the intake manifold, or further, within a distance D that lies within the range of 10-15% of the overall runner length L of one runner in the intake manifold.

In the present example, each passage 114 has substantially the same cross-sectional area, or effective diameter as one another. Furthermore, each passage 114 has a cross-sectional area that lies within the range of 1-5% of the cross-sectional area of the outlet 112 of one of its associated runners for the intake manifold, or further, within the range of 2-3% of the cross-sectional area of the outlet 112 of one of its associated runners for the intake manifold. The cross-sectional area of the outlet 112 of a runner is taken in the plane of the cylinder head mounting face 106 of the intake manifold.

Figure 5:
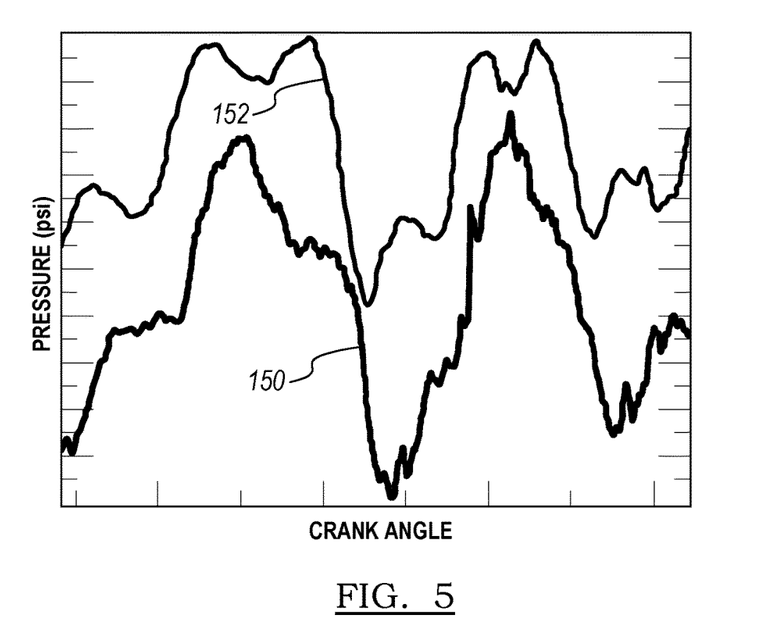
FIG. 5 illustrates a chart of pressure within a runner of an intake manifold according to the present disclosure.

FIG. 5 illustrates a chart showing pressure versus crank angle for a selected crank angle range. Line 150 illustrates the pressure within a runner of the intake manifold of FIG. 2 without any passages 114. Line 152 illustrates pressure within a runner of the intake manifold 100 of FIG. 2 as shown and described and with passages 114.

Pressure waves may form in the intake runners of an intake manifold, such as manifolds 38, 100 due to different phenomena in the engine 20 including: motion of the piston causing a negative pressure wave in the runner towards the plenum during the intake stroke and reflection of the negative pressure wave, e.g. in the plenum, as a positive pressure wave that travels towards the cylinder; negative and positive pressure waves in the intake manifold caused by the exhaust during periods of intake and exhaust valve overlap; and the intake valve closing event, which forms a high-pressure sound wave that travels towards the plenum, and are reflected as a low-pressure wave traveling towards the intake valve.

The pressure waves in the runners of the intake manifold may cause engine 10 and intake manifold 38 noise by forming acoustic waves. The noise may vary with engine speed, as shown below with respect to FIG. 6.

Each runner may act as a resonator as it is a pipe-like element, and may further amplify acoustic energy due to their properties, including their length. In the present disclosure, the addition of the passages 114 acts to mitigate or disrupt resonant noise issues, as seen in at selected engine ranges, such as the mid-speed engine range in the example described herein with respect to FIG. 5, and shown below with respect to FIG. 6. The plenum may act as a volume element that dissipates pressure waves in the intake, for a plenum with a larger effective cross-sectional area than a cross-sectional area of a runner. The plenum may therefore act as a node for pressure wave in the runners.

The passages 114 between the runners 102 fluidly connect adjacent runners 102 to one another, and allow for intake gases in a higher pressure runner to flow into an adjacent, lower pressure runner as the valve timing between adjacent runners is offset, and acts to reduce a pressure wave in the higher pressure runner 102. The passages 114 may provide for controlled leakage on intake gases between adjacent runners 102, and may also reduce or mitigate noise propagation in the intake manifold 100.

In the present example, the passages 114 are positioned at a distance D that is less than the runner length L of a runner, with D being measured from the cylinder head mounting face of the intake manifold. Furthermore, and according to one non-limiting example, the passages may be positioned at a distance D that is 10-15% of the runner length. The passages 114 may have a cross-sectional area that is 2-3% of the runner outlet 112 cross-sectional area.

Furthermore, the intake manifold 100 may contribute to engine noise based on turbulence in the flow of intake gases in the runners, a harmonic resonance of the structure of the intake manifold, or the like.

The passages 114 may additionally add turbulence to the flow of the intake gases to reduce the transmission of acoustic waves, and redirect or bleed flow of intake gases from a high pressure runner to an adjacent lower pressure runner and attenuate noise, or otherwise disrupt the acoustics created by the intake manifold during engine operation.

Figure 6:
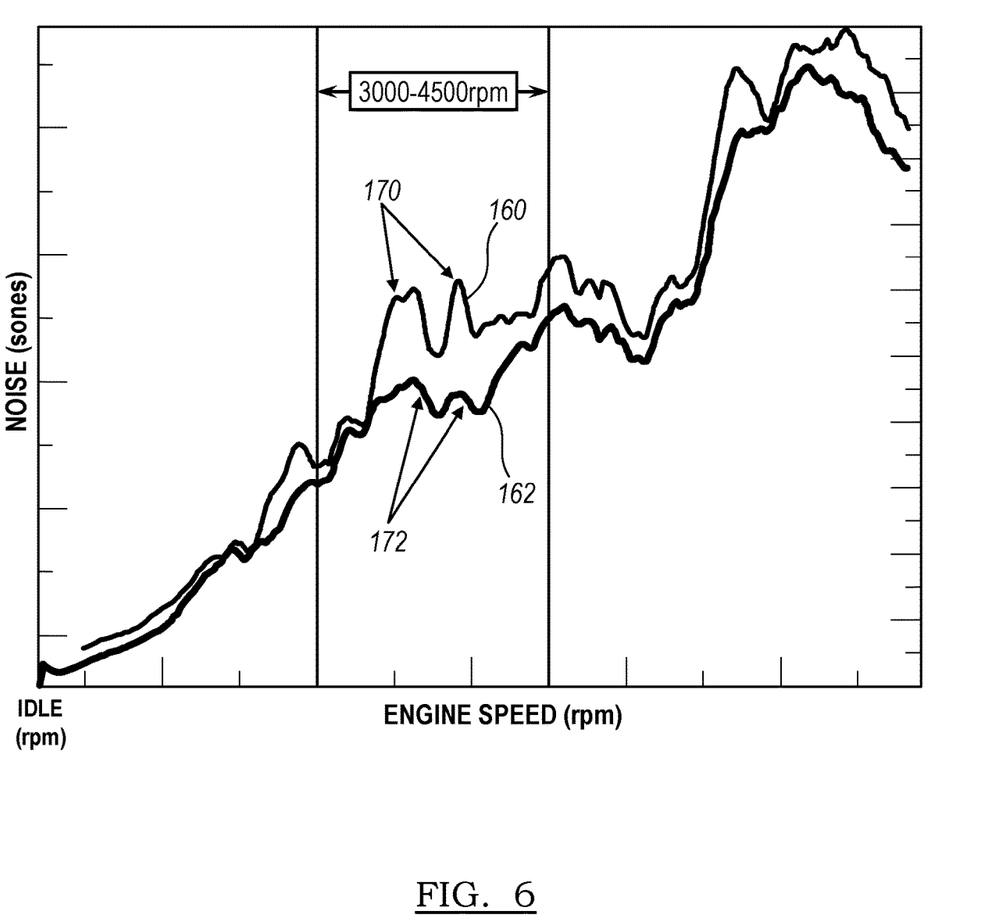
FIG. 6 illustrates a chart of noise as a function of engine speed for an intake manifold according to the present disclosure.

FIG. 6 illustrates a plot of acoustic data from an intake manifold as described above with respect to FIGS. 2-4 in comparison to an intake manifold with a similar geometry, but without any passages (the passageless intake manifold). Line 160 illustrates engine noise with a passageless manifold as a function of engine speed in revolutions per minute (rpm). Line 162 illustrates engine noise with the intake manifold of FIG. 2 as a function of engine speed. The engine noise is plotted as sones versus engine speed, with a sone being a unit of loudness relates to a subjective perception of sound pressure, and one sone being equivalent to 40 phons, with the phons scale aligning with decibel.

For the passageless intake manifold, increased rasp-rattle engine noise 170 is shown in a mid-speed engine operating range, e.g. from 3000-4500 rpm, and the noise was traced via testing to the intake manifold. The testing indicated that the primary forcing function for the noise was acoustic.

As shown in FIG. 6, the addition of passages as described above with respect to FIGS. 2-4 significantly reduced the engine noise in the mid-speed engine operating range, as noted by arrow 172, and this was confirmed with corresponding decreases in duct pressure within the runners as shown in FIG. 5, as well as vibrations on the intake manifold for the intake manifold with the passages.

Use of passages 114 within the intake manifold 100 as described herein may additionally provide for reduced wall thicknesses and structural stiffness of the intake manifold 100 while maintaining or reducing noise caused by the intake manifold, providing for a component with lower weight and increase vehicle fuel economy.

Additionally, testing of the engine 20 and intake manifold 100 indicated that there is no noticeable or significant degradation in engine performance, such as power and torque, of the intake manifold 100 and associated engine in comparison to a passageless intake manifold and engine.

Therefore, a method of controlling engine noise is provided by use of the intake manifold as described herein. For the method, an air intake for the engine is provided with a plurality of runners, with each runner having an internal side wall and extending from a first end to a second end. The first ends of the plurality of runners are connected to a plenum, and the second ends of the plurality of runners intersect an intake mounting face.

A passage is provided between adjacent runners of the plurality of runners to fluidly couple the two adjacent runners. The passage intersects the internal walls of the two adjacent runners; and the passage is spaced apart from the first ends and the second ends of the two adjacent runners.

Intake gases flow through the passage from one runner of the two adjacent runners to the other of the two adjacent runners during engine operation to provide pressure relief from a pressure wave in one runner to an adjacent runner by allowing for controlled leakage from the higher pressure runner to the lower pressure runner. The leakage is controlled by way of the distance and cross-sectional area of the passage as described above and below.

According to one example, the passage is maintained in an open, unobstructed condition during engine operation, and across the range of engine speed operation. In other examples, the passage may be controlled to an open, closed, or partially open position during engine operation, and for example, as a function of engine speed via a valve or other closure member.

The passage is positioned at a distance D from the mounting face, the distance D being in a range of 5-20% of the runner length L, or in a further range of 10-15% of the runner length L.

The passage is formed with a cross-sectional area in a range of 1-5% of a runner outlet cross-sectional area, or further, within a range of 2-3% of a runner outlet cross-sectional area.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An engine comprising:
a cylinder head having a first face, the first face defining a first entrance to a first intake port and a second entrance to a second intake port; and
an intake manifold having a first runner and a second runner each having an internal wall extending from a first end connected to a plenum to second end intersecting a second face of the intake manifold, the second face defining a first outlet from the first runner and a second outlet from the second runner, the first and second faces mating to fluidly connect the first outlet to the first entrance and fluidly connect the second outlet to the second entrance, wherein the intake manifold defines a passage intersecting the internal wall of the first runner and the internal wall of the second runner and directly fluidly coupling the first runner to the second runner to reduce engine noise, the passage positioned between the first and second end of the first runner and spaced apart from the plenum and the second face.

2. The engine of claim 1 wherein the passage between the first and second runner is valveless and remains unobstructed during engine operation.

3. The engine of claim 1 further comprising a valve positioned within the passage to control flow therethrough, the valve controllable between a first, closed position and a second, open position.

4. The engine of claim 1 wherein the passage has a cross-sectional area that is in a range of 2% to 3% of a cross-sectional area of the first runner.

5. The engine of claim 1 wherein the passage intersects each of the first runner and the second runner at a runner length from the second face.

6. The engine of claim 1 wherein the passage is positioned at a distance from the second face, the distance in a range of 10-15% of a runner length of the first runner.

7. An intake manifold comprising at least one shell forming a plurality of runners, each runner having an inner wall extending from a first end to a second end, the second end of each of the runners intersecting a mounting face to define an outlet therefrom, the mounting face adapted to connect to a corresponding mounting face of a cylinder head, wherein the shell defines a passage intersecting the inner walls of two adjacent runners of the plurality of runners, the passage spaced apart from the first and second ends of each of the two adjacent runners, the passage fluidly coupling the two adjacent runners.

8. The intake manifold of claim 7 wherein the passage is without a closure member such that is remains unobstructed.

9. The intake manifold of claim 7 wherein the passage intersects each of the two adjacent runners at a runner length from the mounting face.

10. The intake manifold of claim 7 wherein the shell defines another passage intersecting the inner walls of another two adjacent runners of the plurality of runners, the another passage spaced apart from the first and second ends of the another two adjacent runners, the another passage fluidly coupling the another two adjacent runners.

11. The intake manifold of claim 10 wherein the passage defines a cross-sectional area,
wherein the another passage is defined by the cross-sectional area.

12. The intake manifold of claim 11 wherein the passage intersects each of the two adjacent runners at a distance from the mounting face; and
wherein the another passage intersects each of the another two adjacent runners at the distance from the mounting face.

13. The intake manifold of claim 10 wherein the plurality of runners is defined by n runners, and
wherein the shell defines (n−1) passages, the passage being one of the (n−1) passages, each passage positioned between and fluidly coupling two adjacent runners of the plurality of runners.

14. The intake manifold of claim 10 wherein the plurality of runners is defined by n runners, and
wherein the shell defines (n−2) passages, the passage being one of the (n−2) passages, each passage positioned between and fluidly coupling two adjacent runners of the plurality of runners.

15. A method of controlling engine noise, the method comprising:
providing an air intake for the engine with a plurality of runners, each runner having an internal wall and extending from a first end to a second end, the first ends of the plurality of runners connected to a plenum, and the second ends of the plurality of runners intersecting an intake mounting face;
providing a passage between adjacent runners of the plurality of runners to fluidly couple the two adjacent runners, the passage intersecting the internal walls of the two adjacent runners, the passage spaced apart from the first ends and the second ends of the two adjacent runners; and
flowing intake gases through the passage from one runner of the two adjacent runners to the other of the two adjacent runners during engine operation to reduce engine noise in the plurality of runners.

16. The method of claim 15 further comprising maintaining the passage in an open, unobstructed condition during engine operation.

17. The method of claim 15 further comprising controlling a position of a valve within the passage between a first position and a second position to control flow through the passage, wherein the position of the valve is dependent on an engine speed.

18. The method of claim 15 further comprising positioning the passage at a distance D from the mounting face, the distance D being in a range of 10-15% of a runner length L.

19. The method of claim 15 further comprising forming the passage with a cross-sectional area in a range of 2-3% of a cross-sectional area of one of the runners.

* * * * *